United States Patent Office 3,030,340
Patented Apr. 17, 1962

3,030,340
POLYMERS DERIVED FROM AMINOALCOHOLS AND PHOSPHITES OR PHOSPHONITES
Richard L. McConnell and Harry W. Coover, Jr., Kingsport, Tenn., assignors to Eastman Kodak Company, Rochester, N.Y., a corporation of New Jersey
No Drawing. Filed Apr. 2, 1959, Ser. No. 803,583
7 Claims. (Cl. 260—77.5)

This invention relates to resinous polymers derived from certain aminoalcohols and organic phosphites or phosphonites.

The new class of resinous compounds of the invention may be represented by one of the following recurring structural units:

I.
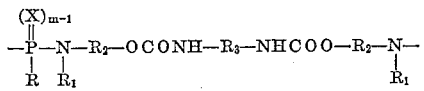

and

II.
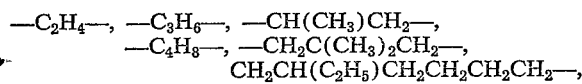

wherein $m$ represents an integer of 1 or 2, X represents an atom of sulfur or oxygen, R represents an atom of hydrogen, an alkyl group of from 1–8 carbon atoms e.g. methyl, ethyl, propyl, isopropyl, butyl, hexyl, 2-ethylhexyl, etc. groups, a phenyl group or a tolyl group, $R_1$ represents an atom of hydrogen, an alkyl group of from 1–4 carbon atoms, a phenyl group or a tolyl group, $R_2$ represents a divalent hydrocarbon group e.g. a straight or branched chain alkylene group of from 2–8 carbon atoms such as e.g., —$C_2H_4$—, —$C_3H_6$—, —$CH(CH_3)CH_2$—,
—$C_4H_8$—, —$CH_2C(CH_3)_2CH_2$—,
$CH_2CH(C_2H_5)CH_2CH_2CH_2CH_2$—, etc. groups, a cycloalkylene group of from 5–6 carbon atoms e.g. —$C_5H_8$— and —$C_6H_{10}$— groups or an arylene group of from 6–7 carbon atoms such as —$C_6H_4$— and —$C_6H_3(CH_3)$— groups, and $R_3$ represents a divalent hydrocarbon group e.g. a straight or branched chain alkylene group of from 4–12 carbon atoms such as —$(CH_2)_4$—, —$(CH_2)_6$—, —$(CH_2)_8$—, —$(CH_2)_{12}$, etc.

groups or an aryl group of from 6–12 carbon atoms such as

—$C_6H_4$—, —$C_6H_3(CH_3)$—, —$C_6H_4$—$C_6H_4$—,
—$C_6H_4$—$CH_2$—$C_6H_4$—, —$C_{10}H_6$—, etc. groups. The above defined resinous polymers of structure I are generally viscous oils when hot but crystalline solids when cold. On modification with organic diisocyanates, the resulting resinous polymers as represented by structure II are solid polymers having high softening points and of limited solubility e.g. some members are soluble in hot dimethylformamide but insoluble in solvents such as acetone, benzene and 1,1-dichloroethane. All of the modified polymers are excellent materials for the preparation of transparent, tough and flame resistant films, sheets and molded articles.

It is, accordingly, an object of the invention to provide a new class of resinous polymers. Another object is to provide resinous materials that are particularly useful for the preparation of tough and flame resistant films, sheets and molded articles. Another object is to provide a process for preparing the same. Other objects will become apparent hereinafter.

In accordance with the invention, we prepare the polymers represented by above structure I by heating an organic phosphite or phosphonite represented by the general formula:

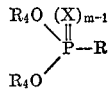

wherein $m$, X and R are as above defined and $R_4$ represents a straight or branched chain alkyl group of from 1–12 carbon atoms e.g. methyl, ethyl, propyl, isopropyl, butyl, sec. butyl, 2-ethylhexyl, 2-ethyl-4-methylpentyl, lauryl, etc. groups, or a cycloalkyl group such as a cyclopentyl or cyclohexyl group, or an aryl group e.g. phenyl or tolyl groups, with an aminoalcohol represented by the following general formula:

$$R_1NH—R_2—OH$$

wherein $R_1$ and $R_2$ are as above defined.

The condensation of the aminoalcohol with the phosphite or phosphonite is generally effected in the absence of a solvent. However, inert solvents may be used, if desired. The operable temperature range of this reaction is about —25° to about 250° C. Catalysts are not required. Ofter the reaction is exothermic. Also, although the reaction takes place with any molar ratio of aminoalcohol and phosphite or phosphonite, preferably an equivalent amount or an excess of the aminoalcohol is employed. If the product is to be reacted with an organic diisocyanate, an excess of the aminoalcohol is preferred to provide amino or alcohol end groups. Suitable organic phosphites and phosphonites include e.g. dimethyl, diethyl, dipropyl, diisopropyl, dibutyl, diisobutyl, bis(2-ethylhexyl), bis(2-ethyl-4-methylpentyl), dilauryl, diphenyl and ditolyl phosphites and corresponding dialkyl and diaryl esters of methyl, ethyl, propyl, isopropyl, butyl, hexyl, 2-ethylhexyl phosphonites including dibutyl phenylphosphonite, dibutyl butylphosphonite, and the like. Since this reaction appears to be a general one, most any aminoalcohol is suitable including, for example, 2-aminoethanol, 3-aminopropanol, 4-aminobutanol, 4-aminopentanol, 5-aminopentanol, 3 - amino - 2,2 - dimethyl-1-propanol, 6-aminohexanol, 8-aminooctanol, 4-amino-1-cyclohexanol, N - ethylaminoethanol, 3 - (ethylamino)-2,2-dimethyl-1-propanol, p-aminophenol, N-phenylaminoethanol, etc.

To obtain the polymers of the invention represented by above structure II, we react the intermediate polymers of structure I with organic diisocyanates represented by the following general formula:

$$OCN—R_3—NCO$$

wherein $R_3$ is as above defined. Suitable diisocyanates include tetramethylene diisocyanate, hexamethylene diisocyanate, 2,4-tolylene diisocyanate, 4,4'-diphenylmethane diisocyanate, 65/35 mixture of 2,4- and 2,6-tolylene diisocyanate, 80/20 mixture of 2,4- and 2,6-tolylene diisocyanate, 3,3'-bitolylene-4,4'-diisocyanate, 1,5-naphthalene diisocyanate, etc. The operable temperature for this reaction can range from about —25° to 300° C. but preferably from 0°–200° C. These condensations are autocatalytic. They can be carried out in bulk, but since the reactions are extremely exothermic, an inert solvent is often advantageously employed. Suitable solvents for this purpose include hydrocarbons, ethers, esters and ketones. In this final condensation, it is advantageous to have equivalent amounts of the diisocyanate and the intermediate condensation products present in order to obtain high-molecular-weight polymers. For example, optimum results are obtained when there is one isocyanate group for each alcohol or amino end group.

The following examples will serve to illustrate further the manner whereby we practice our invention.

Example 1

Diethyl hydrogen phosphite (0.2 mole) and 5-amino-1-pentanol (0.22 mole) were mixed with stirring. The reaction is exothermic after being heated to about 100° C. and the temperature rose to 150° C. When the temperature started to fall, the reaction mixture was heated on a heating mantle to a maximum temperature of 200° C. Ethanol was distilled from the reaction mixture at a head temperature of 76–77° C. When the theoretical amount of ethanol had been liberated (0.4 mole: this required about 6 hours), the temperature of the reaction mixture was lowered to 50° C. The reaction mixture was then stripped under 1 mm. pressure for 1 hour while the temperature of the reaction mixture was raised to about 150° C. This polymeric material was an extremely viscous, colorless oil when hot and a white crystalline solid at 25° C., being represented by the following recurring structural unit:

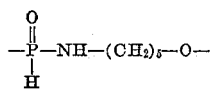

This polymeric material reacted readily with the mentioned diisocyanates to give white, high-molecular-weight polymers suitable for the preparation of transparent, tough and flame-resistant films.

Example 2

Diethyl hydrogen phosphite (0.2 mole) and 2-aminoethanol (0.4 mole) were mixed with stirring. The reaction mixture was heated to 100° C. At this point, an exothermic reaction took place and the temperature of the reaction mixture rapidly rose to 145° C. When the exothermic nature of the reaction had subsided, the reaction mixture was heated on a heating mantle to a maximum temperature of 150° C. while nitrogen was passed through the flask; after 8 hours, the theoretical amount of ethanol (0.4 mole) had been distilled out of the reaction mixture. The product is a viscous transparent oil when hot but cools to a transparent glass.

About 1 g. of the above intermediate was mixed with about 1 g. of 2,4-tolylene diisocyanate with stirring. An extremely vigorous reaction took place and a white solid polymer was obtained immediately. This material was insoluble in acetone, benzene, and 1,1-dichloroethane. It was partially soluble in hot dimethyl formamide. Films cast from this hot dimethyl formamide solution were transparent, tough, and had excellent flame resistance. When this polymer was placed in a flame, it intumesced and formed a large voluminous char. The above polymer may be represented by the following recurring structural unit:

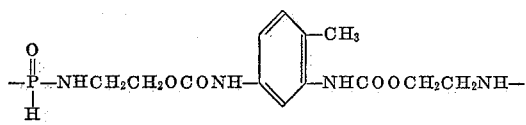

Hot trifluoroacetic acid also dissolved the polymer and films from such solutions were likewise clear, tough and flame resistant.

Example 3

Diphenyl hydrogen phosphite (0.1 mole) and 4-amino-1-cyclohexanol (0.12 mole) were reacted according to the procedure of Example 1 until the theoretical amount of phenol had been liberated. The polymer was a white crystalline solid.

Example 4

Dibutyl phenylphosphonite (0.1 mole) and 5-amino-1-pentanol (0.11 mole) were reacted according to the procedure of Example 1 until the theoretical amount of butyl alcohol had been liberated. This polymeric material was a white solid. About 5 g. of this material was slurried in hot chlorobenzene and 1 g. of hexamethylene diisocyanate dissolved in chlorobenzene was added with vigorous stirring. The reaction mixture was refluxed for 2 hours. Then the white polymeric material which had precipitated was removed by filtration and dried. This high softening polymer is quite flame resistant when placed in a Bunsen flame. The intermediate polymer and the final polymer may be represented by the following recurring structural units, respectively:

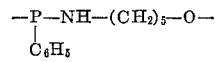

and

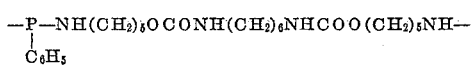

Example 5

Diethyl phosphonothionate (0.2 mole) and 4-(ethylamino)-1-butanol (0.3 mole) were reacted according to the procedure of Example 2 to produce a low molecular weight polymer. When this material was treated with 2,4-tolylene diisocyanate, a high molecular weight polymer was formed which consisted essentially of the following recurring structural unit:

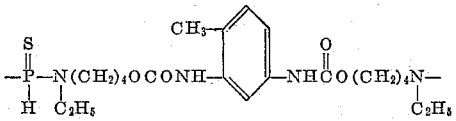

Example 6

Dibutyl butylphosphonate (0.1 mole) and 3-amino-2,2-dimethyl-1-propanol (0.2 mole) were reacted according to the procedure of Example 2 until 0.2 mole of butyl alcohol had been liberated. This polymer on treatment with tetramethylene diisocyanate in accordance with the procedures of Examples 2 and 4, gave a white polymer with a high softening point, that was useful for preparing transparent, tough and flame resistant sheet materials. The polymer softened above 200° C.

The intermediate polymer and the final polymer of the above example may be represented by the following recurring structural units, respectively:

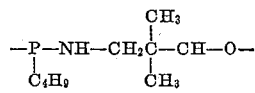

and

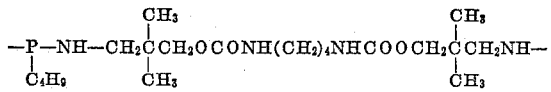

By proceeding according to the above examples, other intermediate polymers of above structure I may also be prepared with any of the mentioned components. These polymers on further reaction with any of the mentioned organic diisocyanates also give high-molecular-weight polymers that are characterized by ability to be formed into transparent, tough and flame resistant films and sheets. These are useful as wrapping materials, photographic film supports, etc. If desired, various fillers, dyes, pigments, softeners, etc. can be incorporated into the polymer compositions.

The invention has been described in detail with particular reference to preferred embodiments thereof, but it will be understood that variations and modifications can be effected within the spirit and scope of the invention as described hereinabove and as defined in the appended claims.

What we claim is:

1. A resinous polymer represented by the following recurring structural units:

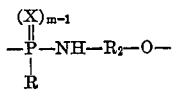

wherein $m$ represents an integer selected from 1 to 2, X represents a member selected from the group consisting of an atom of sulfur and an atom of oxygen, R represents a member selected from the group consisting of an alkyl group of from 1–8 carbon atoms and a phenyl group when said $m$ is 1 and a hydrogen atom when said $m$ is 2, and $R_2$ represents a divalent alkylene group of from 2–8 carbon atoms.

2. A resinous polymer consisting of the following recurring structural units:

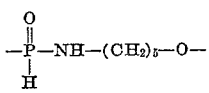

3. A resinous polymer consisting of the following recurring structural units:

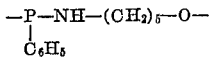

4. A resinous polymer consisting of the following recurring structural units:

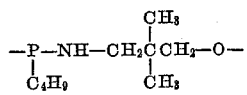

5. A resinous polymer consisting of the following recurring structural units:

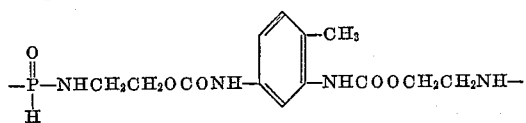

6. A resinous polymer consisting of the following recurring structural units:

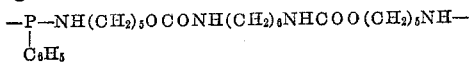

7. A process for preparing a solid resinous, high molecular weight condensation product of (1) a polymer represented by the following recurring structural units:

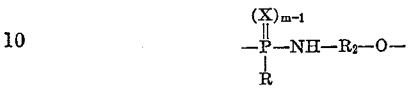

and (2) an organic diisocyanate represented by the following general formula:

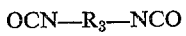

wherein $m$ represents an integer selected from 1 and 2, X represents a member selected from the group consisting of an atom of sulfur and an atom of oxygen, R represents a member selected from the group consisting of an alkyl group of from 1 to 8 carbon atoms and a phenyl group when said $m$ is 1 and a hydrogen atom when said $m$ is 2, $R_2$ represents a divalent alkylene group of from 2 to 8 carbon atoms, and $R_3$ represents a divalent hydrocarbon group selected from the group consisting of an alkylene group of from 4 to 12 carbon atoms, a phenylene group, a tolylene group, a $—C_6H_4—C_6H_4—$ group, a $—C_6H_4—CH_2—C_6H_4—$ group and a $—C_{10}H_6—$ group, which comprises heating at $—25°$ C. to $300°$ C. a mixture of equimolar proportions of said polymer (1) and said organic diisocyanate (2), until the said resinous high molecular weight condensation product is obtained.

References Cited in the file of this patent

UNITED STATES PATENTS

| | | |
|---|---|---|
| 2,682,522 | Coover et al. | June 29, 1954 |
| 2,716,100 | Coover et al. | Aug. 23, 1955 |
| 2,891,915 | McCormack et al. | June 23, 1959 |
| 2,900,365 | Haven | Aug. 18, 1959 |
| 2,926,145 | McConnell et al. | Feb. 23, 1960 |
| 2,948,690 | Fox | Aug. 9, 1960 |
| 2,952,666 | Coover et al. | Sept. 13, 1960 |

UNITED STATES PATENT OFFICE

CERTIFICATE OF CORRECTION

Patent No. 3,030,340                     April 17, 1962

Richard L. McConnell et al.

It is hereby certified that error appears in the above numbered patent requiring correction and that the said Letters Patent should read as corrected below.

Column 5, line 9, for "to" read -- and --.

Signed and sealed this 28th day of August 1962.

(SEAL)
Attest:

ESTON G. JOHNSON                            DAVID L. LADD

Attesting Officer                              Commissioner of Patents